United States Patent [19]

Ribka

[11] 3,928,315

[45] *Dec. 23, 1975

[54] γ-MODIFICATION OF PHENYL-AZO-NAPHTHOL PIGMENT

[75] Inventor: Joachim Ribka, Offenbach am Main, Germany

[73] Assignee: Hoechst Aktiengesellschaft, Frankfurt am Main, Germany

[ * ] Notice: The portion of the term of this patent subsequent to Feb. 15, 1989, has been disclaimed.

[22] Filed: Jan. 25, 1974

[21] Appl. No.: 436,793

Related U.S. Application Data

[63] Continuation of Ser. No. 176,694, Aug. 31, 1971.

[30] Foreign Application Priority Data

Sept. 2, 1970 Germany............................ 2043482

[52] U.S. Cl. ............ 260/204; 260/208; 106/288 Q
[51] Int. Cl.² ................... C09B 67/00; C09B 29/20
[58] Field of Search ......... 260/204, 208; 106/288 Q

[56] References Cited
UNITED STATES PATENTS 3,642,768   2/1972   Ribka................................. 260/204

FOREIGN PATENTS OR APPLICATIONS 1,228,731   11/1966   Germany ............................ 260/204

Primary Examiner—Charles F. Warren
Attorney, Agent, or Firm—Curtis, Morris & Safford

[57] ABSTRACT

A monoazo pigment of the formula

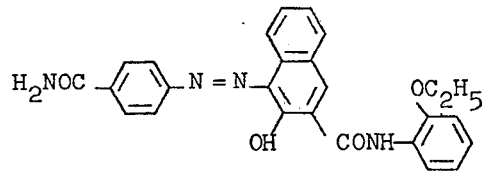

in its new γ-modification, characterized by an X-ray diagram by means of Cu-Kα-radiation, which shows at glance angles of 3.7° and 12.8° maxima of high intensity, at 5.7°, 7.7° and 9.1° maxima of middle intensity and at 4.5°, 6.5°, 7.3°, 8.3° and 11.0° maxima of low intensity and a process for its preparation which comprises heating the α-modification of the monoazo pigment of the same formula in an aqueous suspension, up to temperatures between 90° and 200°C, preferably 95° to 150°C.

The new pigment of the γ-phase according to the invention may be used for the most different pigment applications, for example for preparing printing inks, dispersion paints and for coloring caoutchouc, plastics, natural and synthetic resins. The pigment is further suitable for pigment printing and for coloring in the spinning mass and, especially due to its high covering power, for preparing lacquers. The dyeings obtained in the mentioned media show pure shades and good fastnesses to light, weather and bleeding.

1 Claim, No Drawings

γ-MODIFICATION OF PHENYL-AZO-NAPHTHOL PIGMENT

This application is a continuation application of pending application Ser. No. 176,694 filed Apr. 31, 1971.

The present invention relates to a monoazo pigment of the formula

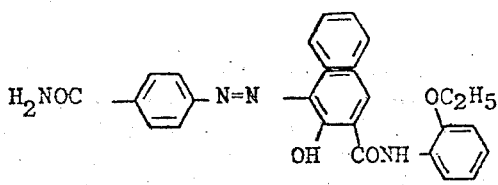

in its new γ-modification, characterized by an X-ray spectrum by means of Cu- Kα-radiation, which shows maxima of high intensity at glance angle values of 3.7° and 12.8°, maxima of middle intensity at 5.7°, 7.7° and 9.1° and maxima of low intensity at 4.5°, 6.5°, 7.3°, 8.3° and 11.0°, the degrees of precision being 1–2 %.

Monoazo pigments of the above formula have already been described in German Patent Specification No. 1,228,731. By coupling diazotized 1-aminobenzene-4-carboxylic acid amide with 1-(2',3'-oxynaphthoylamino)-2-ethoxybenzene according to Example 4, a bluish red pigment is obtained, which is hereinafter termed as β-modification. If the coupling conditions are changed according to Example 4, the pigment is obtained in a different crystal form, which is hereinafter called α-modification and which yields red shades more yellow than the β-modification. The α-modification is characterized by an X-ray spectrum by means of Cu- Kα-radiation which shows maxima of high intensity at glance angle values of 3.8° and 12.8°, maxima of middle intensity at 2.6°, 4.1°, 5.8°, 6.7°, 7.95°, 9.4° and 11.7° and maxima of low intensity at 10.25°. The β-modification is likewise characterized by glance angles with maxima of high intensity at glance angle values of 3.6° and 12.8°, by glance angles of middle intensity of 4.15°, 5.7°, 7.6°, 9.0° and glance angles of low intensity at 6.45° and 14.4°C.

The new γ-phase is prepared by heating the α-phase in an aqueous medium, if desired by addition of organic solvents, up to temperatures of 90°–200°C, preferably 95° to 150°C. The addition of anion- or cation active surface-active agents such as long-chained alkyl amines, alkyl sulfates, alkyl sulfonic acids, alkylaryl sulfonic acids, acylamino acetic acids or acylaminoethane sulfonic acids facilitates the conversion, but is not absolutely necessary. By changing the temperature and the heating time ranging between half an hour and 5 hours, the particle size of the pigment may be affected.

The new pigment of the γ-phase according to the invention may be used for the most different pigment applications, for example for preparing printing inks, dispersion paints and for coloring caoutchouc, plastics, natural and synthetic resins. The pigment is further suitable for pigment printing and for coloring in the spinning mass and, especially due to its high covering power, for preparing lacquers. The dyeings obtained in the mentioned media show pure shades and good fastnesses to light, weather and bleeding.

The dyeings prepared with the pigment of the γ-phase according to the invention have a more yellow shade than those of the β-phase and a more bluish red shade than those of the β-phase. In contradistinction to dyeings of the pigments of the α-modification and the β-modification, obtained according to Example 4 of German Patent Specification No. 1,228,731, the dyeings of the new γ-modification are distinguished by a better fastness to light and especially by a more valuable purer red shade and a higher covering power of the lacquers and polyvinylchloride dyeings.

The following Examples illustrate the invention. Parts and percentages are by weight, unless stated otherwise.

EXAMPLE 1

45 Parts of the α-modification of the pigment according to Example 4 of German Patent Specification No. 1,228,731 in form of the wet filter cake were stirred with 1000 parts of water, heated to a temperature of 130°C and maintained for 3 hours at this temperature. Then the whole was filtered, washed with water, dried and powdered. 44 Parts of a red pigment powder were obtained, which showed in the X-ray diagram the characteristical glance angles of the γ-phase.

The aqueous filter cake of the α-phase was prepared by pouring an alkaline solution of 31.5 parts of 1-(2',-3'-oxynaphthoylamino)-2-ethoxybenzene into a diazotized solution of 13.6 parts of 1-aminobenzene-4-carboxylic acid amide at 15°C and by filtering and washing the resulting pigment.

If 5 parts of the pigment of the γ-phase obtained according to the present Example were ground with 95 parts of an enamel mixture consisting of 40 parts of recinene alkyl resin, 20 parts of a 50 % solution of melamine resin in butanol, 32.5 parts of xylene, 6 parts of ethyl glycol and 1.5 parts of glycol acid butyl ester to form a red colored lacquer, if this lacquer was sprayed on an aluminum foil and stoved for 3 minutes at 140°C, a brilliant red dyeing of good covering power, good fastness to overvarnishing and to light was obtained.

EXAMPLE 2

A solution of 33 parts of 1-(2',3'-oxynaphthoylamino)-2-ethoxybenzene in 200 parts by volume of water and 24.5 parts of a 33 % sodium hydroxide solution were poured at 15°C into a stirred diazonium salt solution prepared from 13.6 parts of 1-aminobenzene-4-carboxylic acid amide, 120 parts by volume of water, 32 parts of a 32 % hydrochloric acid and 6.9 parts of sodium nitrite. The α-modification of the azo pigment was formed. When the coupling was completed, an aqueous solution of 1.5 parts of a condensation product of oleyl chloride and N-methyl taurine were added, and the mixture was heated for 2 hours at 115°–120°C. The whole was filtered, washed and dried. A red pigment was obtained which showed in the X-ray spectrum the characteristical glance angle values of the γ-phase and the properties of which corresponded essentially to the pigment obtained according to Example 1. If 67 parts of polyvinyl chloride, 33 parts of dioctyl phthalate, 2 parts of an organic tin stabilizer and 0.1 parts of the pigment thusobtained were mixed for 8 minutes at 130°C on a roller mill and processed to a foil, a red dyeing of a very good covering power, fastness to light and resistance to bleeding was obtained.

EXAMPLE 3

A solution of 33 parts of 1-(2',3'-oxynapthoylamino)-2-ethoxybenzene in 450 parts by volume of water and 42 parts by volume of 5N sodium hydroxide solution was precipitated at 0° to 3°C by addition of acetic acid. Then the whole was heated to 50°–60°C and coupled at this temperature and a pH value of 6.5 with a diazonium salt solution of 13.6 parts of 1-aminobenzene-4-carboxylic acid amide. The α-modification of the azo pigment was obtained. When the coupling was completed, the pigment was heated to 150°C and maintained for 1 hour at this temperature. The product was filtered, washed and dried. A red pigment was obtained which showed in the X-ray diagram the characteristical glance angle values of the γ-phase and the properties of which corresponded essentially to the pigment obtained according to Example 1.

We claim:
1. A monoazo pigment of the formula

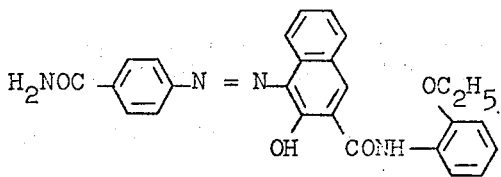

in its new γ-modification, characterized by an X-ray diagram by means of Cu- Kα-radiation, which shows at glance angles of 3.7° and 12.8° maxima of high intensity, at 5.7°, 7.7° and 9.1° maxima of middle intensity and at 4.5°, 6.5°, 7.3°, 8.3° and 11.0° maxima of low intensity.

* * * * *